Sept. 6, 1966
W. A. SACKETT
3,270,886
APPARATUS FOR SEPARATING FINELY DIVIDED
SOLID MATERIALS FROM LIQUIDS
Filed April 25, 1963
3 Sheets-Sheet 1
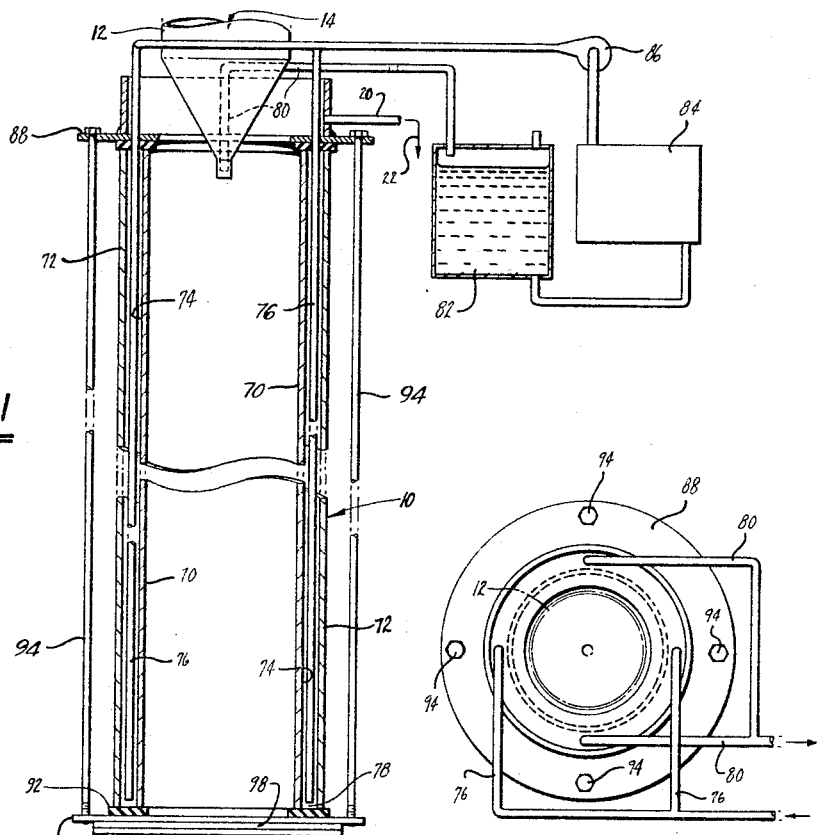
*Fig. 1*
*Fig. 2*
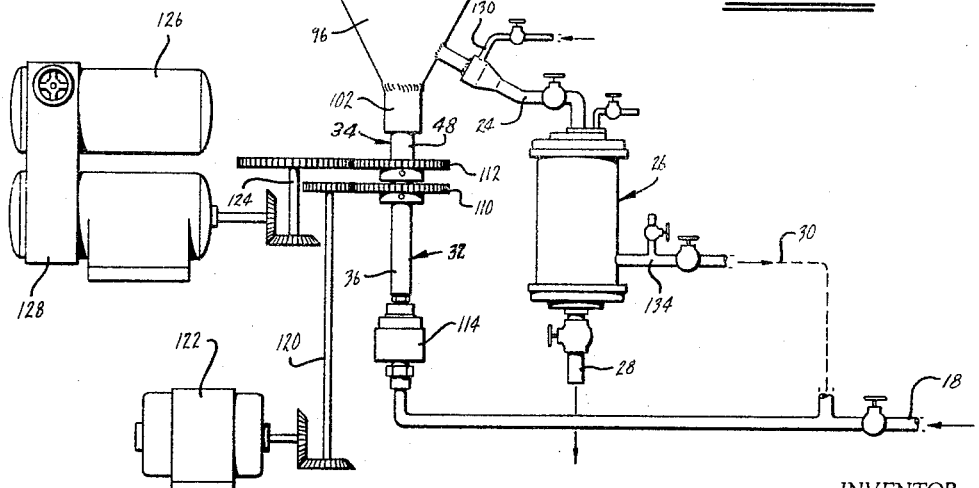
INVENTOR.
Willard A. Sackett
BY *Flehr* *[signatures]*
Attorneys

INVENTOR.
Willard A. Sackett
Attorneys

Sept. 6, 1966 W. A. SACKETT 3,270,886
APPARATUS FOR SEPARATING FINELY DIVIDED
SOLID MATERIALS FROM LIQUIDS
Filed April 25, 1963 3 Sheets-Sheet 3
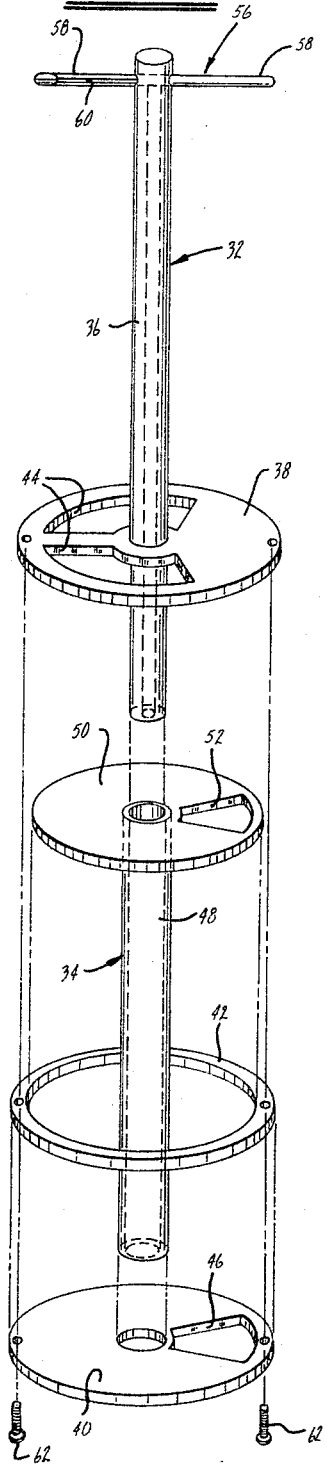
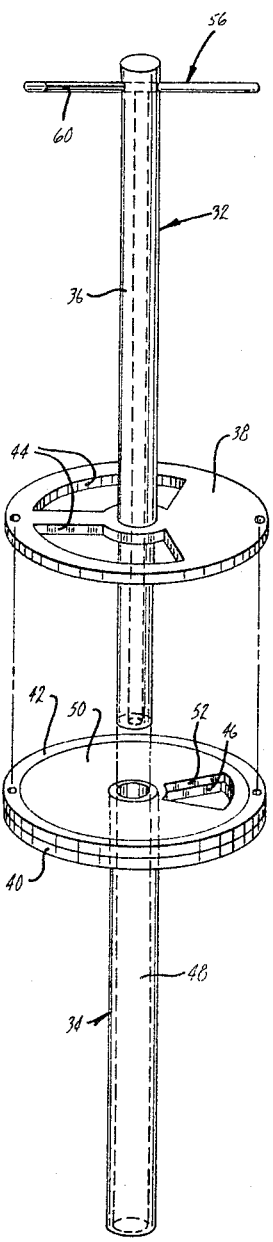
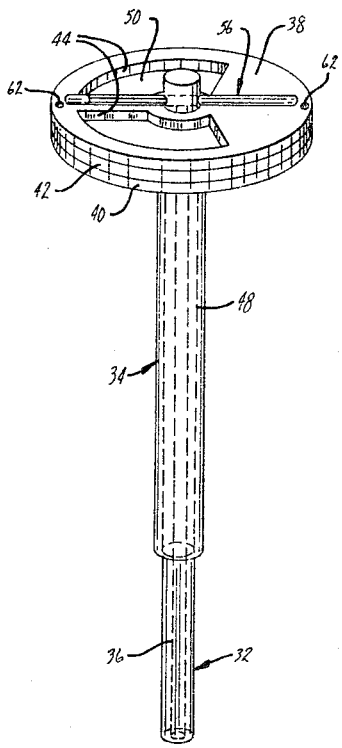
INVENTOR.
Willard A. Sackett
BY
Attorneys

# United States Patent Office 3,270,886
Patented Sept. 6, 1966

3,270,886
APPARATUS FOR SEPARATING FINELY DIVIDED SOLID MATERIALS FROM LIQUIDS
Willard A. Sackett, Woodland, Calif., assignor to Spreckels Sugar Company, San Francisco, Calif., a corporation of California
Filed Apr. 25, 1963, Ser. No. 275,588
9 Claims. (Cl. 210—189)

The present invention relates to apparatus for continuously separating finely divided solids from liquids, for example in continuous treating processes, and specifically relates to apparatus of this type for the controlled withdrawal of granular carbons, bone chars, and similarly treated materials from column adsorption processes.

A recent development of major importance to the sugar industry is the so-called continuous adsorption process, wherein factory liquors and other impure sugar solutions are continuously treated with activated carbon, bone char or like treating materials to effect decolorization, purification and removal of floc forming materials. As presently developed, the finely divided treating material is caused to contact the impure sugar solution in a continuous-countercurrent expanded bed percolating column, for example as disclosed in U.S. Patents 2,954,305, 2,969,297, and 2,969,298. These new systems offer many advantages in the treatment of sugar solutions, particularly when compared to the conventional fixed bed systems, in that they offer the benefit of continuous operation with greatly expanded contact surfaces without the problems of channeling, excessive pressure drops, and blanking or "blinding" of the surface of the treating material so often experienced in the use of the fixed bed systems. The operating characteristics and advantages of these column adsorption processes have been described in detail in the literature (see "Factory Treatment of Process Liquors Using Activated Carbon in a Continuous Process to Improve Sugar Quality," Sugar y Azucar, May and June 1961).

While the continuous expanded bed percolation systems have proved highly effective if not revolutionary in use, some problems still remain. For example, in the present state of the art, the spent adsorbent material is customarily withdrawn by hydraulic means from a conical discharge zone at the bottom of the column. Discharge therefore depends upon a collapse of the carbon or like adsorbent treating material as it flows downward into the inverted cone, following which the relatively dense material is withdrawn in "slugs" (i.e., as in a piston). However, due to operating variables within the column, ideal conditions for carbon withdrawal are seldom realized, and the adsorption efficiency of the column is substantially decreased. A somewhat less serious difficulty is that the rate of withdrawal is variable, and not readily controlled. As a result, when the proportion of liquid withdrawn with the adsorbent is decreased below a minimal value, the hydraulic system suffers from such defects as plugging of the discharge lines or other evidences of limited withdrawal capacity. Efforts to increase the withdrawal rate are therefore limited by the hydraulic capacity. Withdrawal rates are also influenced by the density, viscosity, temperature, etc., of the intermixed sugar solution, which must be controlled or the flow rates adjusted at intervals to obtain a desired rate of withdrawal.

In general, an ideal mechanism for withdrawing spent treating material should discharge material uniformly across the cross section of the column. Such mechanism should also permit close control of withdrawal rates while providing a capacity to vary the rate within rather wide limits. Such mechanism should also operate to discharge treating material from an expanded bed as well as a collapsed bed, without adverse effects due to variations in solution density, viscosity, temperature, etc. Preferably, the mechanism should also be able to separate spent treating material from the treated liquid, in the manner described, either from the bottom or the top of the treating column. However, prior to the present invention, no truly effective mechanism or apparatus had been devised for accomplishing these requirements.

In general, it is an object of the present invention to provide an effective apparatus for continuously separating finely divided treating materials from liquids at a predetermined controlled rate.

Another object of the invention is to provide an apparatus of the above character that can be effectively utilized as a means to withdraw finely divided granular carbons, bone chars, and similar treating materials from various types of continuous adsorption columns.

Another object of the invention is to provide apparatus of such character which will act to withdraw spent treating materials from continuous expanded bed percolation systems across the entire cross section of the expanded bed.

Another object of the invention is to provide apparatus of such character adapted to effect a positive rate of withdrawal of spent treating material, which can be accurately controlled as to the rate of withdrawal within wide limits.

Another object of the invention is to provide apparatus of such character wherein withdrawal rates of treating material are uneffected by variations in temperature, density, or viscosity of the liquid undergoing treatment, or similar variables.

Another object of the invention is to provide apparatus of such character which can be employed successfully in columns wherein the liquid flow is either up or down.

A still further object of the invention is to provide apparatus of such character wherein the liquid to be treated is uniformly fed to an expanded treatment bed so that the liquid is evenly distributed across the entire bed cross section.

Another object of the invention is to provide apparatus of the character just described which maintains a hydraulic balance within the expanded bed, without any tendency towards channeling or reduced treating or adsorption efficiency within the bed.

Other objects and advantages of the invention will appear from the following description of a preferred apparatus shown in the drawings in which:

FIGURE 1 is a view in section and elevation of a treating column embodying apparatus for continuously separating the treating material in accordance with the invention;

FIGURE 2 is a partly diagrammatic view in top plan of FIGURE 1;

FIGURES 4 and 5 are partially exploded perspective views illustrating the assembly of working portions of the continuous separation mechanism shown in FIGURES 1 to 3; and FIGURE 6 is a perspective view of such mechanism following assembly.

Figure 3:
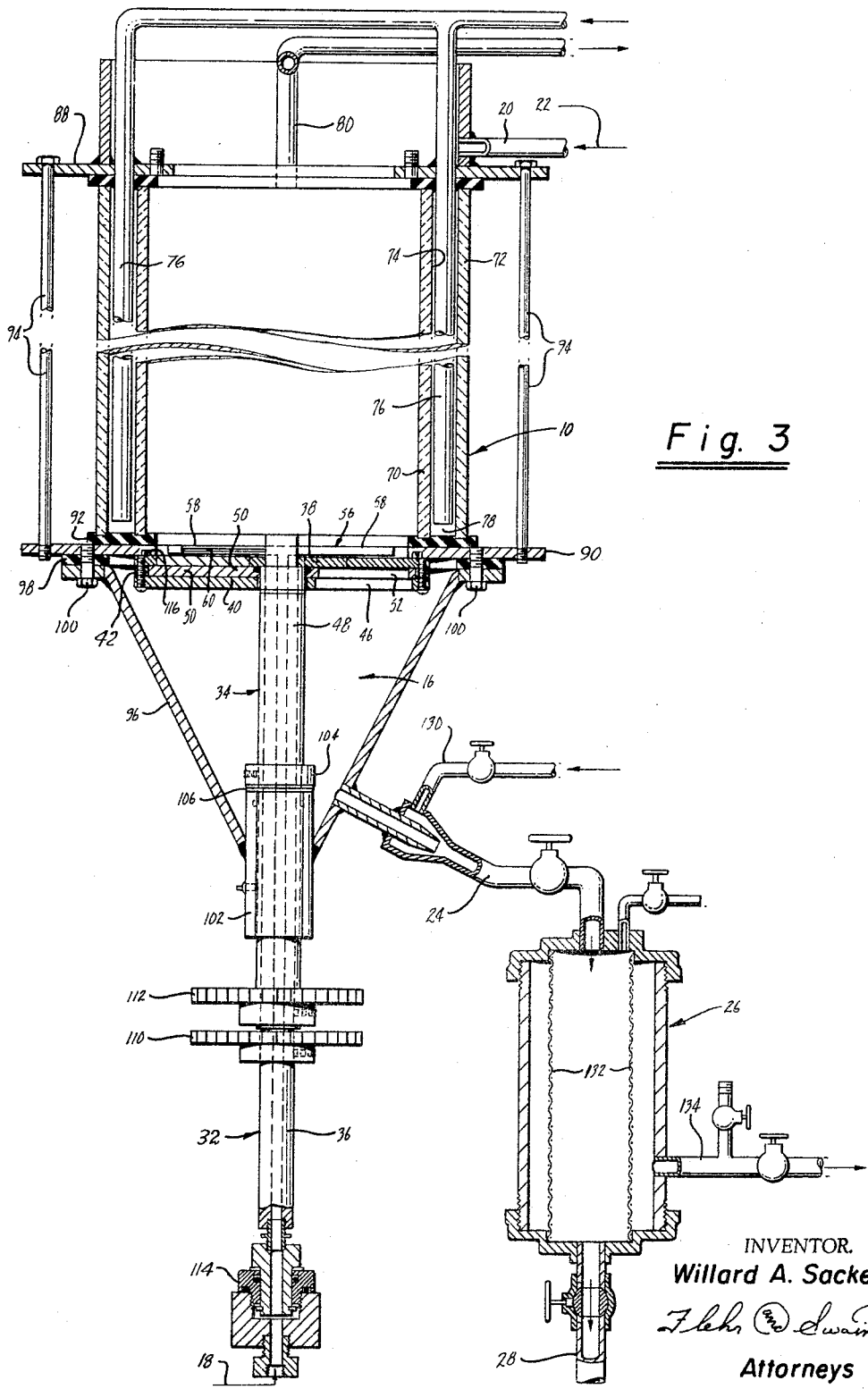
FIGURE 3 is an enlarged sectional view of the liquid feed and material discharge portions of the apparatus of FIGURE 1.

In general, the present invention makes use of a rotary mechanism which can be positioned at either end of a continuous treatment column, to effect a continuous controlled separation and withdrawal of the treating material from the liquid undergoing treatment. More specifically, the present invention makes use of a pair of rotary mechanisms each provided with an aperture and adapted to rotate at diffrent relative speeds. Preferably one of the rotary mechanisms employs spaced apart rotary plates having apertures of relative large size, which are angularly displaced with respect to one another. A second rotary mechanism with a metering aperture is positioned between the spaced apart plates and rotated at a different relative speed, thereby effecting a metering of the treating material in stages through the apertures of each of the plates in a continuous discharge or separating operation. It is contemplated that one of the rotary mechanisms, say the rotary metering plate, will be rotated at constant speed, and that the other rotary mechanism will be rotated at variable speeds. However, many variations are possible, as will appear.

Referring to the preferred embodiment of the invention illustrated in the drawings, 10 indicates a continuous adsorption column of the type generally illustrated and described in any of the aforementioned patents, 2,954,305, 2,969,297, and 2,969,298. As therein described, adsorbent columns such as the column 10 are employed in a continuous countercurrent process in which sugar solutions are passed upwardly through an expanded, downwardly-flowing bed of an activated granular regenerable adsorbent material. In the operation of such columns, a substantially lineal ascending column of the sugar liquor is contacted continuously by a lineally descending column of adsorbent, with a sufficient length of countercurrent travel and with regulation of the rates of flow so that the adsorbent bed is expanded from its fully settled state to an expanded state of about 5 to 15%, but below the point of turbulence. In such operation, it is essential that the entering sugar solution has a uniform distribution over the cross-sectional areas of the descending bed, and that flow rates are controlled so that there is no tendency towards channeling through the expanded bed. As also disclosed in the indicated patents, the continuous treating columns can additionally be used in "desweetening" operations wherein sugar occluded on the adsorbent treating material is recovered in a continuous percolation with hot wash water. In general, the columns employed in the continuous adsorption or desweetening treatments are substantially identical in construction, although the latter are usually smaller in size than the adsorption columns.

Assuming the use of the column 10 in a continuous adsorption or desweetening process, FIGURE 1 generally illustrates the flow of processing materials. Thus, the adsorbent or treating material is introduced to the top of the column through a suitable charging mechanism 12, as indicated by the arrow 14. The sugar solution wash water or like process liquid is continuously introduced to the bottom of the column, in the present case through the adsorbent separating mechanism, as generally indicated at 18. The treated liquid or liquid product leaves the top of the column through the outlet 20, as indicated by the arrow 22. Simultaneously, the spent adsorbent or treating material is discharged from the column along with some liquid through operation of the separating mechanism 16 and leaves the column through the line 24. The intermixed liquid and spent treating material are then separated by suitable means 26, with the separated treating material being discharged at 28 for further use in the processing or, alternatively, regeneration and return to the system. The liquid recovered from the separating mechanism 26 can be recycled to the feed liquor, as indicated by the dashed arrow 30.

In accordance with the present invention the separating mechanism 16 performs the function of separating the treating material from the treated liquid, continuously, and at a predetermined controlled rate. Referring to FIGURES 1 and 4, the illustrated separating mechanism 16 generally comprises a pair of rotary units 32 and 34, each mounted for independent rotation about a common axis. As best illustrated in FIGURES 4 and 5, the unit 32 comprises an elongated hollow shaft 36 to which is affixed upper and lower discharge or separating plates 38 and 40, spaced apart by a spacing ring 42. In the exemplary device, the upper plate 38 is provided with a pair of discharge apertures 44 of relatively large size. The lower plate 40 is similarly provided with a discharge aperture 46 of somewhat smaller size than the apertures 44 and angularly displaced therefrom with respect to the axis of the shaft 36.

The rotary unit 34, best seen in FIGURE 4, similarly comprises a hollow shaft to which is nonrotatably affixed a metering plate 50 provided with a metering aperture 52. The metering aperture 52 is substantially smaller than the apertures 44 in the upper plate 38 of the unit 32, and preferably somewhat smaller than the discharge orifice 46 of the lower plate 40. In FIGURES 4 to 6, which illustrate the assembly of the separating mechanism 16, the metering plate 50 is flush with the top of shaft 48, permitting it to be received within the spacing ring 42 separating the upper and lower plates 38, 40 of first rotary unit 32.

To assemble the separating mechanism 16, the upper plate 38 is first welded or otherwise secured on the shaft 36 at a position just below the distributor head 56. The shaft 48 of the unit 34 is then slidably positioned on the shaft 36 of the unit 32 so that the metering plate 50 is just beneath the plate 38, and the lower plate 40 and the spacing ring 42 assembled in position on the upper plate 38, for example by machine screws 62. This general construction permits the two units 32 and 34 to be mounted so that the spaced apart plates 38, 40 and the metering plate 50 can be rotated independently of one another, for example, as shown in FIGURES 3 and 6.

As indicated previously, the shaft 36 of the unit 32 is preferably hollow, thereby providing a convenient means for introducing the liquid to be treated through the adsorbent separating mechanism 16 when the latter is in place in the bottom of the column 10. To insure a uniform liquid feed to the entire cross section of the descending bed of treating material in the column, a liquid distributing head 56 is preferably secured to the top plate 38 so as to be in fluid communication with the interior of the hollow shaft 36. Preferably, the distributing head 56 comprises a pair of projecting distributor arms 58, each provided with an elongated slot 60 adapted to discharge liquid under suitable fluid pressure along the length of the arm. This construction coupled with the rotary movements of the distributing arms insures a distribution of the liquid feed evenly over the bed cross section of the column. It also minimizes the chances of undesired channeling of the liquid through the descending expanded bed of treating material.

Referring more specifically to FIGURE 1, the treating column 10 is constructed with inner and outer cylindrical walls 70 and 72 to provide a jacket or space 74 to receive heat transfer medium. The latter, which generally comprises hot or cold water, or steam, enters through the inlet conduit 76 for discharge at the bottom of the jacket space as indicated at 78. The heat transfer medium then passes upwardly through the jacket and is discharged through the conduits 80 for recycling within the heat transfer system. The latter may include the usual reservoir 82, heater or refrigerator unit 84 and fluid pump 86, as diagrammatically shown in FIGURES 1 and 2. In the illustrated apparatus, the column is held together by top and bottom flanged plates 88 and 90, which sealingly receive the walls of the column between resilient gasketing 92 and which are rigidly held in place by the supporting and tensioning members 94.

Depending from the lower flanged plate 90 is a conventional conical bottom 96, which in the illustrated apparatus is resiliently attached to the bottom of the column by means of rubber gasketing 98 and suitable fastening members 100. Welded or otherwise secured within a bottom opening in the cone is a collar or sleeve 102 which rotatably receives the separating mechanism 16 previously described. As best shown in FIGURE 3, the separating mechanism is supported during its rotary movements by a collar 104 which is rigidly secured to the shaft 48 of the rotary unit 34, and which rides on antifriction washers 106 mounted between the rotary collar 104 and the fixed collar 102. At its lower end the hollow shaft 36 is connected to the liquid feed line 18 by means of a swivel coupling or similar connection 114, thereby insuring an uninterrupted flow of process liquid to the bottom of the column. At its top, the separating mechanism is sealed against bypass or leakage of the descending column of adsorbent material about the periphery of the upper plate 38 by suitable gasketing such as the O ring 116.

As best illustrated in FIGURE 1, the rotary units 32 and 34 are each provided with a drive attachment to effect their independent rotation. Thus, the gear 110 is nonrotatively secured to the shaft 36 of the unit 32 to effect independent rotation of the spaced apart plates 38 and 40 and the liquid distribution head 56. In like fashion, the gear 112 is nonrotatively secured to the rotary shaft 48 of unit 34 to effect independent rotation of the metering plate 50. As will be understood, rotation of the units 32 and 34 at different relative speeds will cause the metering aperture 52 of the metering plate to first pass beneath the openings 44 of the upper discharge plate 38, and subsequently to pass over the discharge opening 46 of the lower discharge plate 40.

An understanding of the operation of the separating mechanism 16 can best be obtained by describing its use in a typical countercurrent operation of the column 10.

Assuming a steady state operation wherein activated carbon or other treating material is introduced to the top of the column, and a sugar or other solution is continuously introduced to the bottom of the column through the swivel fitting 114 and hollow shaft 36, the liquid will pass upward through the column and be discharged adjacent the top, as at 22. Simultaneously the treating material will gravitate downward through the ascending liquid until it comes in contact with the separating mechanism 16. According to one mode of operating the separating mechanism, the metering plate or disk 50 is rotated at a predetermined rate of speed by means of the drive connection 124 between the gear 112 and the drive unit or motor 126. The discharge plates 38, 40 are simultaneously rotated at a relatively different rate by means of the drive connection 124 between the gear 110 and the drive unit or motor 122. If desired, the relative rates of rotation of the plates 38, 40 and the plate 50 can be controlled by a suitable varidrive control unit for the motors 122 and 126, as indicated at 128.

Under the conditions just described, the treating material falls through the openings 44 of the upper discharge plate, and due to the faster rotation of the plate 38 with respect to the metering disk 50, soon fills the metering aperture 52. Eventually, the solid portion of the upper plate 38 passes over the metering aperture 52 sealing this aperture from the bottom of the column. At the same time, the angularly displaced relation of the lower discharge opening 46 insures that the solid portion of the plate 40 serves to retain the material within the discharge aperture 52. As the plates 38 and 40 continue to rotate relative to the plate 50, the opening 46 in the lower plate 40 eventually moves into a position of register with the metering aperture 52. Preferably, the positioning of the respective apertures is such that the metering aperture is completely covered by the upper plate 38 before the opening 46 begins to move beneath the metering aperture. Then, as the discharge opening 46 subsequently rotates beneath the metering aperture 52, its contents are discharged or dumped through the opening 46 of the lower plate 40 into the cone 96. This operation repeats itself as the plates continue their relative rotation with the metering aperture 52 filling and discharging at constant predetermined time intervals. Should it be desired to increase the rate of separation or withdrawal of treating material, the control 128 can be manipulated to increase the relative rate of rotation of the unit 32 with respect to the unit 34, and consequently the relative rate of rotation of the metering aperture 52 with respect to the apertures 44 and 46 in the discharge plates 38 and 40. Should the rate of discharge of treating material be too rapid, the control 128 can be similarly manipulated to reduce the relative rate of rotation of the unit 32, to thereby reduce the rate of filling and emptying of the aperture 52 per unit of time. The rate of withdrawal can thus be varied as desired by merely changing the relative rate of rotation of the central metering disk 50 with respect to the plates 38 and 40.

Following its withdrawal or separation as described above, the treating material can be removed from the cone 96 in the conventional manner by hydraulic means. In the illustrated apparatus, this is accomplished by a discharge spout or nozzle 24 assisted, as necessary, by pressurized streams of sugar, water, or other liquid introduced through the line 130. In general, however, the necessary additional liquid for discharging the treating material from the cone 96 is obtained as a result of the clearance between the top and bottom plates 38 and 40 of the unit 32 and the plate 50 of the unit 34.

The spent treating material is subsequently removed from the entrained discharge liquid externally of the column, for example by the unit 26. The latter, as illustrated in FIGURE 3, can comprise a simple filtration unit employing a wire mesh screen or similar filtering media 132. As will be understood, the liquid passes through the filter 132 and is discharged through the line 134. The spent treating material which collects within the unit 26 is periodically discharged through the line 28. Preferably the separated liquid discharged through the line 134 is reintroduced into the column feed line, as indicated at 30 in FIGURE 1.

It will be understood that the above description of the operation of the system is intended merely as illustrative and that many variations are possible in the general operation of the mechanism. For example, it may be desirable to operate the center plate 50 at a constant rate, and the plates 38 and 40 at a variable rate. Alternatively, the top and bottom plate assembly of the unit 32 could be rotated at a constant speed, and the rate of rotation of the metering plate 50 varied. In like fashion, while it is preferred in the system described to rotate the top and bottom plate assembly at a faster rate than the metering plate, the system can be successfully operated when the top and bottom plate assembly rotate at a slower speed than the metering plate.

In addition to the foregoing, the separating mechanism of the invention can be used in various different treating operations involving both countercurrent and concurrent flow of the liquid and treating material. To illustrate, in the apparatus described, the liquid could be introduced at the top of the column along with the descending treating material, in a concurrent flow operation. In such a system, the separating mechanism 16 would still function to withdraw the treating material from the bottom of the column, at a desired predetermined rate. Such concurrent operation could likewise be employed in a column where the separating mechanism was located at the top of the column. In the latter case, both the treating material and the liquid would be forced under fluid pressure upwardly through the column. In like fashion, the separating mechanism of the invention makes it possible to carry out treating operations in a horizontal plane, utilizing a horizontal flow of treating materials and liquids. These and other variations in the construction and use of the described separating mechanisms are clearly within the skill of one in this art, and within the intended scope of the invention.

As a specific illustration of the use of the separating mechanism in accordance with the invention, a standard factory sugar solution was treated in the apparatus shown in FIGURE 1 in a continuous countercurrent adsorption process wherein the sugar solution was passed upwardly through an expanded, downwardly flowing bed of activated carbon adsorbent. The center or metering disk 50 was rotated at a constant rate of one revolution every seven minutes. The rate of rotation of the top and bottom plate assembly 32 was varied, as indicated in the table below. The amount of carbon withdrawal was then observed over a series of runs, each thirty minutes in duration, to determine the effect of varying the relative rate of rotation of the central metering plate and the spaced apart discharge plates. The results are set forth in the attached table.

*Table I*

| Run No. | Speed of Discharge Plate Assembly, Minutes per Revolution | Weight of Dry Carbon Discharged | |
|---|---|---|---|
| | | Grams/Min. | Total |
| 1 | 0.61 | 1.67 | 50 |
| 2 | 0.61 | 1.62 | 48.5 |
| 3 | 0.61 | 1.75 | 52.5 |
| 4 | 0.72 | 1.35 | 40.5 |
| 5 | 0.72 | 1.35 | 40 |
| 6 | 0.93 | 1.15 | 34.5 |
| 7 | 0.93 | 1.08 | 32.5 |

These data generally show the uniformity of carbon withdrawal at a particular speed of rotation of the top and bottom discharge plate assembly and the effect of changes in the speeds of rotation of said discharge plate assembly with respect to the metering plate.

I claim:

1. In apparatus for continuously separting finely divided solid materials from liquids at a predetermined controlled rate, first rotary means having a discharge aperture therein, second rotary means having a metering aperture therein, said first and second rotary means being mounted for rotation in close proximity to one another and to a body of liquid containing finely divided solid materials to be separated therefrom, and independent means for rotating each of said first and second rotary means at different relative speeds to thereby achieve a relatively rapid movement of said discharge aperture adjacent said finely divided solid materials and a controlled metering of said finely divided solid materials through said discharge and metering apertures.

2. Apparatus as in claim 1 wherein control means are provided to vary the rate of rotation of one of said rotary means relative to the other, said control means providing an effective control over the rate of metering of said finely divided solid materials through said aperture.

3. In liquid treating apparatus wherein liquid and finely divided treating materials are continuously circulated through an elongated column, means for separating said finely divided materials from said liquid at a predetermined controlled rate comprising: first rotary means mounted for rotation adjacent one end of said column and about the axis thereof, said rotary means having a discharge aperture therein adapted to move across substantially the entire cross section of said elongated column, second rotary means likewise mounted for rotation about the axis of said column and in close proximity to said first rotary means, said second rotary means having a metering aperture therein, and means for rotating said first and second rotary means at different relative speeds to thereby achieve a relatively rapid movement of said discharge aperture adjacent said finely divided solid materials and a controlled metering of said finely divided materials through said discharge and metering apertures.

4. Apparatus as in claim 3 wherein said first rotary means employs spaced rotary members each having an aperture, the apertures of said members being angularly displaced from one another as they rotate relative to the axis of said column.

5. Apparatus as in claim 4 wherein said second rotary means employs a rotary member positioned between said spaced rotary members.

6. Apparatus as in claim 4 wherein the spaced rotary members of said first rotary means are provided with apertures angularly displaced from one another relative to the axis of rotation and larger in dimension than the metering aperture of the rotary member of said second rotary means.

7. Apparatus as in claim 3 wherein each of said rotary means is mounted on a separate shaft means, one of said shaft means being received for relative rotation within the other of said shaft means.

8. Apparatus as in claim 7 wherein both of the shaft means mounting the rotary means for rotation are hollow, the inner of said shaft means being provided with a fluid distribution head adapted to introduce a uniform feed of liquid to said column.

9. In an elongated column wherein a finely divided treating material is continuously circulated in contact with a liquid undergoing treatment, means to continuously supply finely divided treating material to said column, means to continuously supply liquid to be treated to said column, and means to continuously separate the finely divided treating material from the treated liquid at a predetermined controlled rate, said last named means comprising first rotary means having a discharge aperture therein, means to rotate said first rotary means so that said discharge aperture moves relatively rapidly across substantially the entire cross section of said elongated column, second rotary means having a metering aperture therein, separate means to rotate said second rotary means, said first and second rotary means being mounted at one end of said column for rotation in close proximity to one another about an axis coincident with the axis of said column, said rotary means serving to discharge spent finely divided treating material from said column, and means to control the relative rates of rotation of said first and second rotary means to achieve a relatively rapid movement of said discharge aperture adjacent said finely divided solid materials and a controlled metering of said finely divided solid materials through said discharge and metering apertures.

References Cited by the Examiner

UNITED STATES PATENTS

| 329,305 | 10/1885 | Gaunt | 210—268 |
| 1,559,905 | 11/1925 | Moorman | 222—370 X |
| 2,705,594 | 4/1955 | Brewer | 23—310 X |
| 2,898,010 | 8/1959 | Tepper | 222—370 X |
| 2,921,842 | 1/1960 | List | 23—310 X |
| 3,013,780 | 12/1961 | Wistrich | 23—270.5 X |

REUBEN FRIEDMAN, *Primary Examiner.*

C. DITLOW, *Assistant Examiner.*